United States Patent [19]

Suur-Askola

[11] Patent Number: 5,633,773
[45] Date of Patent: May 27, 1997

[54] OVERVOLTAGE PROTECTION FOR INPUT/OUTPUT CIRCUITS

[75] Inventor: Seppo Suur-Askola, Riihimäki, Finland

[73] Assignee: Kone Oy, Helsinki, Finland

[21] Appl. No.: 699,042

[22] Filed: Jul. 30, 1996

Related U.S. Application Data

[63] Continuation of Ser. No. 421,483, Apr. 13, 1995, abandoned.

[30] Foreign Application Priority Data

Apr. 14, 1994 [FI] Finland ................... 941720

[51] Int. Cl.$^6$ ................................. H02H 9/04
[52] U.S. Cl. ................................. 361/56; 361/83
[58] Field of Search ................. 361/56, 83, 91, 361/94, 111

[56] References Cited

U.S. PATENT DOCUMENTS

| | | | |
|---|---|---|---|
| 3,790,856 | 2/1974 | Hutchinson | 361/56 |
| 4,644,437 | 2/1987 | Robe | 361/56 |
| 4,651,251 | 3/1987 | Thiele | 361/91 |
| 5,034,845 | 7/1991 | Murakami | 361/56 |
| 5,038,244 | 8/1991 | Tuusa | 361/56 |
| 5,243,488 | 9/1993 | Bernier et al. | 361/56 |
| 5,276,582 | 1/1994 | Merrill et al. | 361/111 |

FOREIGN PATENT DOCUMENTS

| | | |
|---|---|---|
| 0401410 | 12/1990 | European Pat. Off. . |
| 0490787 | 6/1992 | European Pat. Off. . |
| 0541097 | 5/1993 | European Pat. Off. . |
| 3128638 | 7/1983 | Germany . |
| 3408788 | 9/1985 | Germany . |
| 9216019 | 9/1992 | WIPO . |

OTHER PUBLICATIONS

"Crowbar Protection," Elektor Electronics, vol. 18, No. 202, 01 Jul. 1992, p. 51.

*Primary Examiner*—Jeffrey A. Gaffin
*Assistant Examiner*—Michael Sherry

[57] ABSTRACT

The invention relates to a method for protecting an I/O electronic circuit against overvoltages. The I/O circuit of the electronic circuit is provided with a current path (1) comprising a first diode (V1N), through which current path a current (ip) flows when the mains voltage is negative, and with a second current path (2) comprising a second diode (V1P) and a thyristor (T1), the thyristor (T1) being fired by a time-delay circuit charged by a positive voltage, and that the current flowing through the current paths (1,2) is used to trigger a protection device.

11 Claims, 2 Drawing Sheets

OVERVOLTAGE PROTECTION FOR INPUT/OUTPUT CIRCUITS

This application is a continuation of application Ser. No. 08/421,483 filed on Apr. 13, 1995, now abandoned.

The present invention relates to a method and apparatus for protecting input/output circuits against overvoltages.

BACKGROUND AND SUMMARY OF THE INVENTION

Overvoltages occur every now and then and they cause damage in sensitive I/O electronics. I/O voltages are of the order of 0 . . . 32 V. For example, if a mains voltage (230 V, 50 Hz) happens to be applied to an I/O pin, ordinary I/O electronics will be damaged beyond repair. This results in maintenance problems and increased costs. There are various components, such as varistors and overvoltge Zeners, for protection against lightning and instantaneous overvoltages. However, if a voltage of 230 V is supplied directly to an electronic circuit, such components will not withstand it. If an installer makes a mistake, 230 V may be connected to low-voltage circuits, and this will result in further damage to equipment and safety risks. The components cannot endure a voltage of 230 V and they have a very limited power capacity. The method of the invention prevents the application of an overvoltage to sensitive I/O electronics in the event of a malfunction. In this protection system, the voltage at an I/O pin will never exceed the allowed values. The invention provides the following advantages:

- does not cause any change in the operating points of the I/O electronics or in any other delays or impedances of the I/O electronics
- simple I/O lines
- cheap when there are a large number of I/O lines
- allows high data transmission speeds
- filters radio-frequency interference
- requires no filters
- can be installed as an option in old elevators, enabling old circuits to be protected afterwards.

BRIEF DESCRIPTION OF THE DRAWINGS

In the following, the invention is described in detail by the aid of an example by referring to the attached drawings representing the operation of the protection circuit.

DESCRIPTION OF THE PREFERRED EMBODIMENTS

Figure 1:
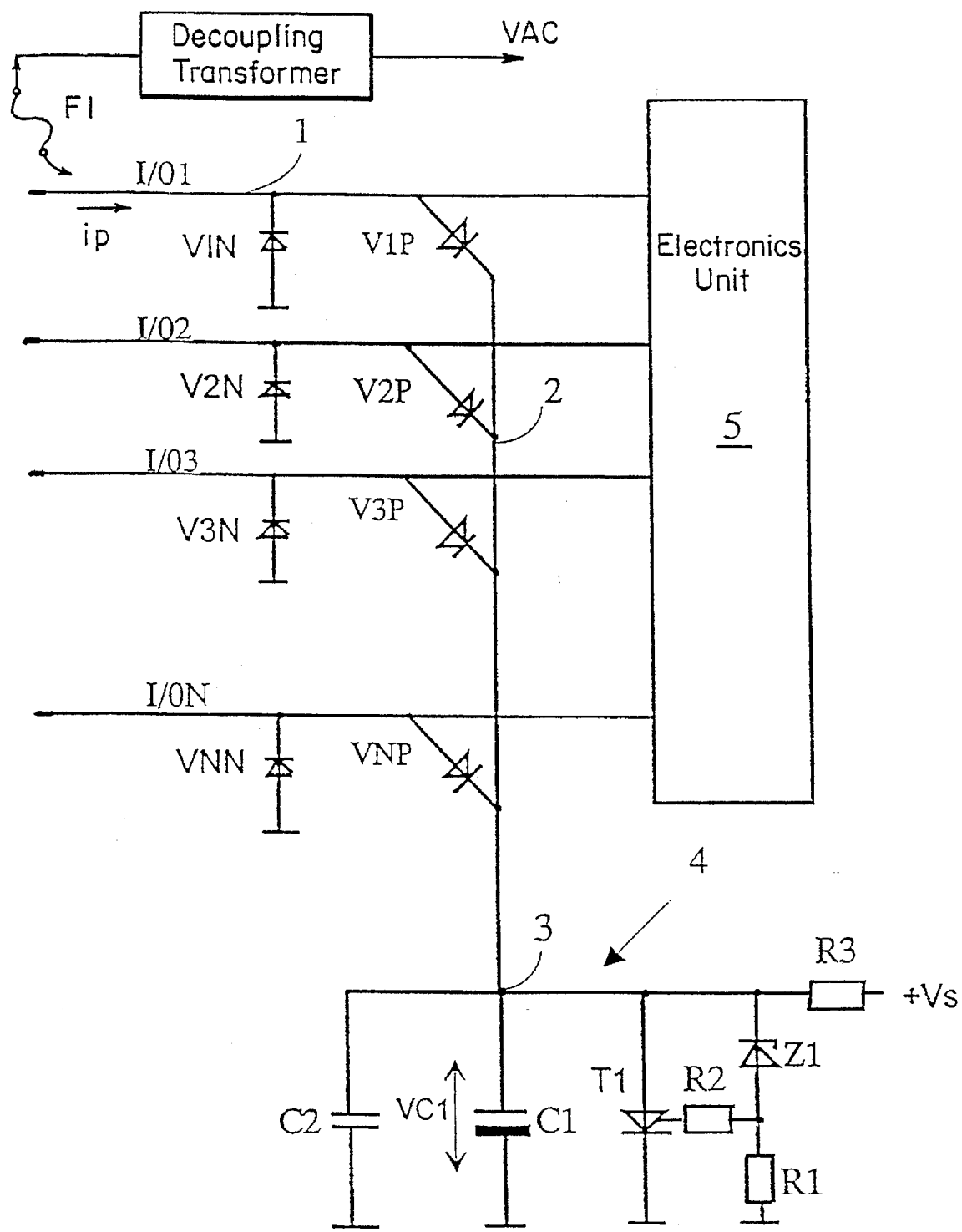
FIG. 1 illustrates the operation of one preferred embodiment of the protection circuit.
Figure 2:
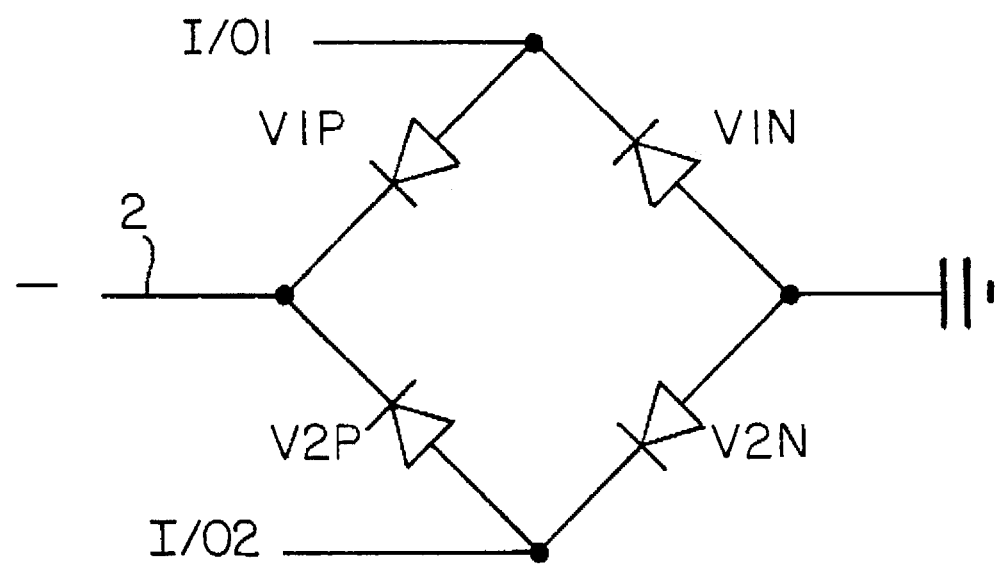
FIG. 2 presents a diode bridge used to replace diodes V1N,V2N,V1P and V2P.

The operation of the preferred protection circuit is illustrated by FIG. 1. Comprised in the overvoltage protection circuitry is pin I/O1, which belongs to the electronic circuit and is the starting point of a current path 1. Connected to this conductor is a diode V1N, whose anode is connected to ground. The current path continues further to an electronics unit 5. The anode of a second diode V1P is also connected to this current path 1. A current ip flows along current path 1 via diode V1P and further along current path 2 via pin 3 to circuit 4, which is common to all the I/O circuits, and in this circuit to capacitor C1, which is connected in parallel with capacitor C2, both of which are connected to ground. Connected in parallel with capacitor C1 is also a thyristor T1, whose gate is connected to a resistor R2. The other end of this resistor R2 is connected via resistor R1 to ground and via Zener diode Z1 and pin 3 to conductor 2. A power source +Vs is connected via resistor R3 to pin 3. A time-delay circuit is formed by the first capacitor C1 and the thyristor connected in parallel with it, the thyristor firing circuit being connected via Zener diode Z1 to pin 3. FIG. 2 presents a diode bridge which can be used to replace diodes V1N,V2N, V1P and V2P in FIG. 1. The diode bridge is a commonly known circuit. The mains voltage VAC is a voltage obtained from the public network and is used as an energy source in instrument panels. In the event of a malfunction, the mains voltage VAC may come into contact with an I/O line. If the mains voltage VAC is negative at the instant the malfunction occurs, then it follows that the current ip will flow along current path 1 from pin I/O1 via diode V1N to ground, blowing the fuse of the VAC source. This fuse is the common electricity supply fuse of the instrument panel and is placed in the secondary circuit of a decoupling transformer. If the mains voltage VAC is positive at the moment of malfunction, then it follows that the current ip will flow along current path 1 via the first diode V1P and further along current path 2 to pin 3 and to capacitor C1 in circuit 4. In a normal situation, C1 is charged to voltage +Vs via resistor R3. +Vs is a voltage source (e.g. 24 V) and its function is to keep the triggering limit of the protection circuit above the instrument panel supply voltage. The current ip charges capacitor C1 until the voltage VC1 exceeds the triggering level of the Zener diode Z1. VC1 is a voltage to which the capacitor C1 may be charged before the thyristor is fired and discharges capacitors C1 and C2. When the triggering level is exceeded, a current is passed to the gate of the thyristor via resistor R2. This switches the thyristor T1 into conduction. The current ip will now flow through the thyristor T1 until the fuse of the VAC source is blown. Resistor R1, which is connected to ground, prevents spurious firing of the thyristor. Resistor R1, connected between the gate and cathode of the thyristor T1, is designed to reduce the impedance of the gate circuit and to pass spurious energies past the gate to the cathode, thus preventing the gate voltage from rising to the firing level. Capacitor C2, connected in parallel with capacitor C1, receives transient interference peaks. The diodes V1N-VNN and V1P-VNP and the thyristor T1 must have current ratings exceeding the fusing value of the fuse. The current flowing through current paths 1 and 2 is used to trigger the protection device. An unlimited number of I/O lines can be connected. It is obvious to a person skilled in the art that different embodiments of the invention are not restricted to the examples described above, but that they may instead be varied within the scope of the claims presented below. For instance, the term thyristor is intended to encompass a triac, transistor, GTO thyristor or IGBT transistors.

I claim:

1. A method for protecting an I/O circuit of an electronic circuit against overvoltages, comprising the steps of:

(a) connecting the I/O circuit of the electronic circuit to a current path comprising a first diode through which current flows when the voltage on the I/O circuit is a negative overvoltage;

(b) providing the I/O circuit of the electronic circuit with a second current path comprising a second diode connected in series to a time-delay circuit at a first node; the time delay circuit including a thyristor connected between the first node and ground and having a gate, a zener diode connected in series with a first resistance between the first node and ground, and a second resistance connected between the gate and a second node linking the zener diode and the first resistance, whereby the thyristor is fired by a time-delay in the time-delay circuit when the voltage on the I/O circuit is an a positive overvoltage, the current flowing through the current paths providing the overvoltage protection.

2. The method according to claim 1, further including the step of:

(c) providing a first capacitor connected to the time-delay circuit in parallel with the thyristor, and a second capacitor for removing transient interference voltage peaks.

3. The method according to claim 1 or 2, further including the step of providing the first diode, the second diode, and the thyristor with current ratings exceeding the fusing value of a mains fuse included in the secondary circuit of a decoupling transformer.

4. The method according to claim 3, further including the step of connecting the time-delay circuit to a plurality of I/O circuits.

5. The method of claim 2, wherein said step (c) includes connecting said second capacitor in parallel with said first capacitor.

6. An apparatus for protecting an input/output circuit of an electronic circuit against overvoltages, comprising:

a conductor for the input/output circuit of the electronic circuit;

a first reverse-biased diode having an anode connected to ground and a cathode connected to said conductor;

a second forward-biased diode connected between the conductor and a first node; and a time-delay circuit connected between the first node and ground, said time-delay circuit including a first capacitor and a thyristor connected in parallel between the first node and ground, a gate of said thyristor being connected through a Zener diode to the node and to a cathode of said second diode.

7. The apparatus according to claim 5, further including a plurality of conductors, each for a respective I/O circuit and connected through respective first reverse-biased diodes to ground and through respective second forward-biased diodes to the first node, wherein the first and second diodes are connected as a bridge circuit.

8. The apparatus of claim 7, wherein said time-delay circuit further includes:

a second resistance connected between said Zener diode and the gate of said thyristor, said second resistance connecting to said Zener diode at a second node;

a first resistance connected between the second node and ground;

a third resistance connected between said first node and a positive voltage source; and a second capacitor connected in parallel with said first capacitor between said first node and ground, said second capacitor having a smaller capacitance than said first capacitor and absorbing transient voltage peaks at said first node.

9. The apparatus of claim 6, wherein said time-delay circuit further includes a resistance connected between said Zener diode and the gate of said thyristor.

10. The apparatus of claim 9, wherein said resistance connects to said Zener diode at a second node, and further including another resistance connected between the second node and ground.

11. The apparatus of claim 6, wherein said time-delay circuit further includes a resistance connected between said first node and a positive voltage source.

* * * * *